United States Patent [19]

Rieck et al.

[11] Patent Number: 4,541,774
[45] Date of Patent: Sep. 17, 1985

[54] TURBINE COOLING AIR DESWIRLER

[75] Inventors: Harold P. Rieck, West Chester; Ralph A. Kirkpatrick, Mason, both of Ohio

[73] Assignee: General Electric Company, Cincinnati, Ohio

[21] Appl. No.: 518,762

[22] Filed: Aug. 1, 1983

Related U.S. Application Data

[63] Continuation of Ser. No. 402,007, Jul. 26, 1982, abandoned, which is a continuation of Ser. No. 145,543, May 1, 1980, abandoned.

[51] Int. Cl.[4] .............................................. F01D 5/08
[52] U.S. Cl. ..................................... 415/115; 415/175
[58] Field of Search ................ 415/115, 116, 175, 176

[56] References Cited

U.S. PATENT DOCUMENTS 2,618,433  11/1952  Loos et al. ........................... 415/115
3,712,756   1/1973  Kalikow et al. ..................... 415/175
4,236,869  12/1980  Laviello ........................... 415/115 X

FOREIGN PATENT DOCUMENTS 712051  6/1954  United Kingdom ................ 415/175

OTHER PUBLICATIONS

"CF6-80 Engine Technical Review", vol. 1, Feb. 1979, General Electric Corp.

Primary Examiner—Henry C. Yuen
Assistant Examiner—John Kwon
Attorney, Agent, or Firm—Stephen S. Strunck; Derek P. Lawrence

[57] ABSTRACT

A device is provided for efficiently directing nonrotating cooling air into a rotating turbine rotor. The device employs a nozzle to accelerate the cooling air in the direction of rotor rotation. A diffuser-deswirler then directs this air, with curved and expanding flow passages, into corresponding holes in the turbine rotor. With these elements, the device directs the cooling air into the rotating rotor section without significant pressure losses and with a lower resultant cooling air temperature.

1 Claim, 4 Drawing Figures

TURBINE COOLING AIR DESWIRLER

CROSS REFERENCE TO A RELATED APPLICATION

This is a continuation of application Ser. No. 402,007, filed July 26, 1982, which is a continuation of application Ser. No. 145,543, filed May 1, 1980, and both now abandoned.

BACKGROUND OF THE INVENTION

1. Field of the Invention

This invention relates to cooling air flowpaths for high temperature turbines.

2. Description of the Prior Art

In the field of gas turbine technology a great deal of research has been directed towards improving thermodynamic efficiency by operating gas turbine engines at higher temperatures. To permit the engines to operate at the new gas stream temperatures which are higher than internal materials can normally tolerate, considerable effort has been devoted by engine manufacturers to development of advanced and highly efficient methods of cooling internal turbine hardware. In particular, components in the hot gas stream, such as turbine nozzle guide vanes and rotor blades, are exposed to very severe temperatures and require significant amounts of cooling air.

In early designs, cooling methods of these high temperature parts were limited to transferring of heat from turbine part surfaces to low temperature parts by conduction. When air cooling methods were introduced they were originally limited to blowing cooling air across the face of turbine discs.

In contrast, today's more advanced turbine technology utilizes hollow turbine nozzle vanes and blades with high pressure cooling air being drawn through internal passages within the vanes and blades. This internal cooling method has proven to be very effective, but it requires delivery of significant amounts of cooling air to the blades and vanes. The normal delivery path for blade cooling air presents a significant mechanical obstacle. The problem is the air must be drawn from a nonrotating source of compressed air, usually the compressor outlet, through a rapidly rotating turbine shaft. Forcing the air through this rotating shaft causes aerodynamic losses which translate into an increase in the temperature of the air. Because the air is used to cool hot turbine parts, any increase in the temperature of the air means that a greater volume must be used and this results in a decrease in engine efficiency.

Recently, turbine engines have employed nozzles that are aimed in the direction of turbine rotation to accelerate this cooling air in the direction of rotation for ease of entry into the rotating shaft. The nozzle directs the air through simple holes drilled through the shaft wall. To reach the turbine blades, the air must pass through these holes in the shaft, then move radially outward into the hot turbine blades.

While this improvement has been employed with reasonable success, further gains are achievable. Analysis has shown that after exiting the turbine nozzle, the cooling air has a very high velocity that is actually greater than the rotational speed of the turbine shaft. This means the cooling air has a tangential velocity that is greater than the tangential velocity of the shaft. When the air slows down to pass through the shaft holes, a large pressure loss occurs. This represents an unrecoverable loss of energy. Also, if the air is flowing to a smaller radius, as in passing under a turbine disc, its tangential velocity will increase even more, sometimes actually causing an acoustic resonance. Recently turbine engines have employed flat radial vanes inside the turbine shaft to remove residual tangential velocity in the cooling air. This has been successful in eliminating acoustic resonance but has further increased the aerodynamic losses in the cooling airflow system. These potential problems can be avoided by eliminating any excess tangential velocity of the cooling air before the air enters the turbine shaft.

It is, therefore, an object of the present invention to direct nonrotating cooling air into a rotating turbine section of a gas turbine engine without significant pressure losses and with lower resulting cooling air temperatures and reduced cooling airflow requirements.

It is another object of the present invention to direct cooling air into a rotating turbine section without excessive tangential velocity.

These and other objects will become more readily apparent from reference to the following description taken in conjunction with the appended drawings.

SUMMARY OF THE INVENTION

In one embodiment, the present invention is comprised of shaped turning vanes that correspond with, and are attached to, holes in a turbine shaft wall. The vanes are provided for turning the flow direction of cooling air that has been accelerated out of a nozzle in a direction that is tangent to the shaft wall, to a new direction that is parallel to the shaft hole centerlines. The vanes thereby direct the cooling air into the the rotating shaft holes without significant pressure losses and with a lower resultant cooling air temperature.

In addition, the vanes are provided with passages that expand in the direction of airflow for the purpose of diffusing the air and increasing static pressure. The entrance loss is reduced by providing an aerodynamically shaped inlet. This reduced entry loss combined with pressure recovery by diffusion permits the use of a higher pressure ratio nozzle which increases the effectiveness of the system and reduces the cooling air exit temperature relative to the rotor. Reduced cooling air temperature permits a reduction in cooling airflow and ultimately improves turbine cycle efficiency.

DESCRIPTION OF THE PREFERRED EMBODIMENTS

Figure 1:
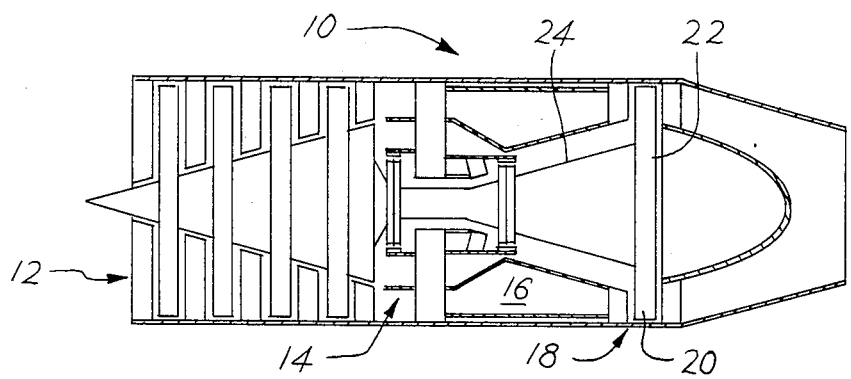
FIG. 1 is a cross-sectional view of a typical gas turbine aircraft engine.

Referring now to FIG. 1, a gas turbine aircraft engine 10 is shown for the purpose of describing the basic components and functions of the engine and some general aspects of a cooling air flowpath. A description of the basic engine functions begins as incoming air enters a compressor 12 where it is compressed to a very high pressure that will support rapid combustion further downstream in the engine. This highly compressed air is directed through a compressor outlet 14 into a combustor 16 where the air is combined with fuel and ignited. The ignited air/fuel mixture forms hot combustion gases that accelerate from the combustor 16 into a turbine section 18. In the turbine section, these accelerated combustion gases are directed at turbine blades 20 causing them to rotate at very high velocities. The turbine blades 20 are connected with rotors 22 to a turbine shaft 24 for the purpose of transferring power to the turbine shaft. The shaft 24 can be connected mechanically to whatever device the engine user wishes to drive mechanically. In a typical aircraft engine, the turbine shafts are used to drive both the compressor 12 and a fan (not shown) that accelerates air to provide forward thrust for an airplane.

In carrying out these basic engine functions, it must be appreciated that maximum power can be derived from the combustion gases at a cerain thermodynamically determined optimum temperature. Unfortunately, the calculated best temperature is so high that operation of the engine in the optimum manner would quickly destroy engine parts exposed to the hot combustion gases. Therefore, gas turbine engines are actually run at a temperature somewhat below the thermodynamically determined optimum level.

In efforts to improve engine efficiency by allowing higher temperature operation, recent design efforts have been directed at devising air-cooled turbine components in the combustion flowpath. These efforts have been very successful and have vastly improved the efficiency of the modern gas turbine engine. However, this cooling air must be derived from a high pressure source, such as the engine compressor 12, and any air taken from the engine compressor represents a parasitic loss in air available for combustion and a loss to engine power output.

In view of this parasitic loss, much effort has been directed at improved methods of handling this cooling air so that less air must be taken from the compressor 12 to cool the hot turbine parts.

Figure 2:
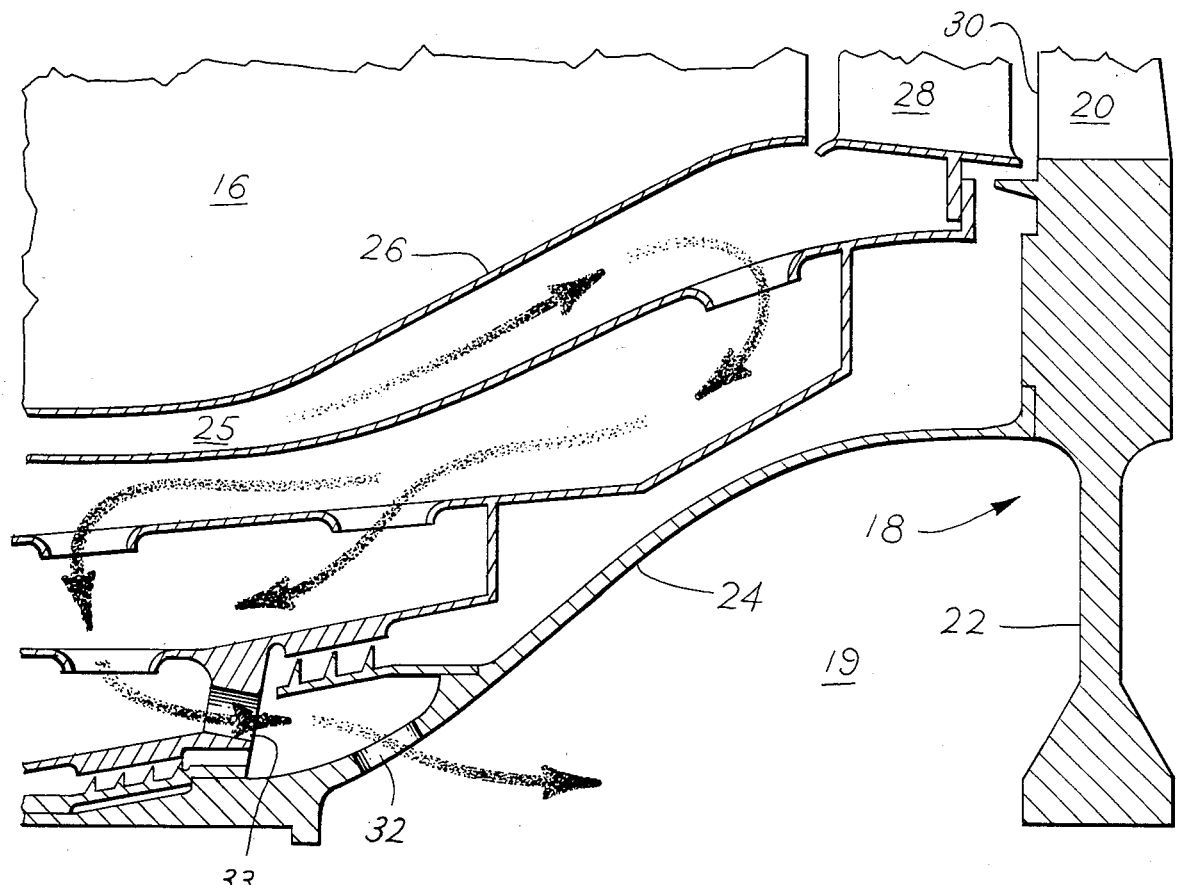
FIG. 2 is an enlarged cross-sectional view of a portion of a gas turbine engine showing a typical prior air cooling air path.

Referring now to FIG. 2, a section of a prior art engine and an internal cooling air flowpath is shown. The path of the cooling airflow is generally depicted by the heavy shaded arrows. The cooling air flows from the compressor outlet (not shown in FIG. 2), to a region 25 surrounding a combustor wall 26, and eventually through a turbine shaft 24 into a turbine rotor cavity section 19. This is a very critical region of the cooling air flowpath because the air is being directed at the highest temperature turbine parts, including a first row of turbine blades 30. The air must be maintained at high pressure because in order to flow into and through the blades 20, the air must be higher in pressure than the combustion gases surrounding the nozzles and blades. Since the combustion gases have just left the compressor 12 and combustor 16, they are still at relatively high pressure in relation to the rest of the engine.

While this is a critical region of the cooling air flowpath, the technical difficulties of moving air in this region of the engine are further complicated because the air is flowing from a nonrotating section of the engine through a rotating shaft 24 into a rotor cavity 19. The air must be rapidly accelerated in a rotational direction where it enters the turbine shaft 24, generally through a plurality of holes 32 in the wall of the shaft. Significant inefficiencies and pressure changes can occur in this region where the nonrotating air flows through the holes 32.

In an attempt to lessen these inefficiencies, engine designers have recently incorporated a nozzle device 34 in cooling air flowpaths of the type shown in FIG. 2. The simple nozzle device 33 is provided to accelerate the cooling air in the direction of turbine rotation. As a result of this acceleration, the air is caused to flow in a direction tangential to the shaft circumference. If the air has a tangential velocity greater than that of the shaft, a large pressure loss occurs when the air passes through the shaft holes. In addition, if the air is flowing to a smaller radius, as in passing under a first stage turbine rotor 22, its tangential velocity will increase and this may cause an acoustic resonance. Eliminating the excess tangential velocity ahead of the shaft holes will significantly improve this situation, and that has been stated as an object of the present invention.

Figure 3:
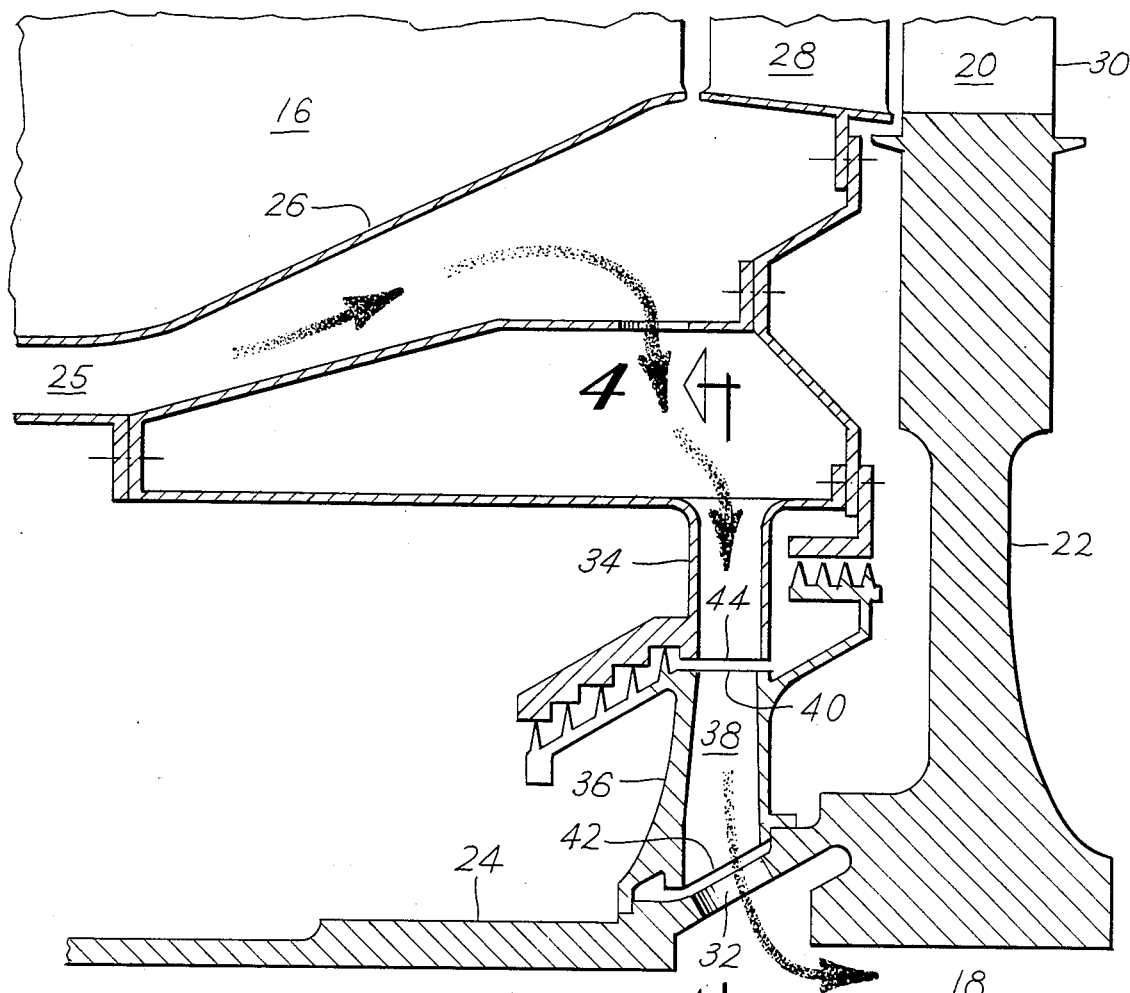
FIG. 3 is an enlarged cross-sectional view of a similar portion of a gas turbine engine, as that shown in FIG. 2, but incorporating one embodiment of the present invention.

Referring now to FIG. 3, one embodiment of the present invention is shown where it has been incorporated into the region of the engine 10 where cooling air enters the turbine shaft 24. The invention incorporates a deswirler 36 mounted in the air flowpath where the air enters the shaft 24. The function of the deswirler 36 is to aerodynamically change the direction of flow of the cooling air and guide the air into the holes 32. The deswirler additionally functions to reduce rotational velocity so that it becomes similar in magnitude to the rotational velocity of the turbine shaft 24. The deswirler 36 is directly attached to the turbine shaft 24 so it rotates in exactly the same manner. This feature enables the deswirler 36 to reduce rotational velocity of the cooling air as the deswirler directs the air into the holes 32.

Another feature of one embodiment of the deswirler 36 that can be appreciated in FIG. 3, is the deswirler passages 38 can be formed with a cross-sectional area that expands from the deswirler entrance 40 to the deswirler exit 42. These continuously expanding passages 38 function as a diffuser thereby converting part of the air's approach velocity head into static pressure. Again, it must be emphasized this cooling air is directed into a high pressure area of the turbine, and it is very desirable to maintain high cooling air pressure at the point where the air enters the shaft holes 32. Therefore, in the particular application of the deswirler 36, shown in FIG. 3, it is highly desirable to expand its internal passages 38 and provide this diffusing function.

Figure 4:
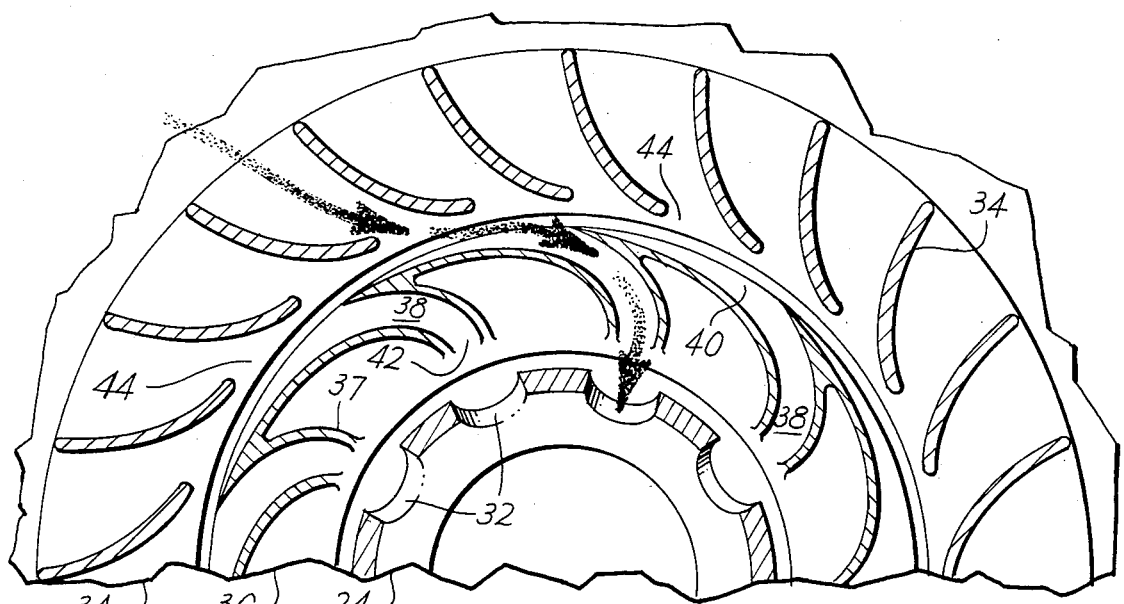
FIG. 4 is a cross-sectional view of one embodiment of a deswirler component of the present invention.

Referring now to FIG. 4, the nozzle 34, deswirler 36 and shaft holes 32 are shown in a manner such that the directional effects of the nozzle and deswirler on the cooling airflow can be readily appreciated. The flowpath of the cooling is depicted by the shaded arrows. In the course of this flowpath, the nozzles 34 are generally aligned in serial flow relationship with the deswirler entrances 40, and the deswirler exits 42 are similarly aligned with the shaft holes 32. This provides a generally aerodynamic flowpath for the cooling air.

To summarize, the deswirler can be described as having internal vanes forming passages with entrance regions between the vanes. The curved inner surfaces of the passage entrance regions are aligned in serial flow relationship with the nozzles for aerodynamically accepting accelerated cooling air. Intermediate regions of the passages are located downstream of the entrances. The intermediate regions have progressively increasing cross-sectional area for decelerating and diffusing the cooling air. Finally, the deswirler passages have exit regions between the vanes. The curved inner surfaces of the exit regions are aligned in serial flow relationship with holes provided in the turbine shaft for aerodynamically directing the cooling air into the shaft.

OPERATION OF THE INVENTION

The reader is now referred to the parts as shown in FIGS. 3 and 4 for the purpose of discussing the operation of the subject invention.

As stated earlier, the cooling medium must be derived from a source of relatively high pressure air within the engine. One ideal location is the region 25 surrounding the combustor wall which is just downstream of the compressor outlet. This air is at very high pressure, and its location just upstream of the turbine section 18 permits routing into the turbine shaft 24.

The first step in diverting this air into the turbine section 18 is to accelerate the air in the direction of turbine rotation. As described earlier, this is accomplished with the nozzle 34. The operation of a nozzle is well known to those skilled in the art, and any of a variety of types may be used to accelerate the air. The degree of cooling air acceleration can be varied by changing the nozzle construction.

After passing through the nozzle exits 44, the air is directed into the deswirler entrances 40. The deswirler 36 is comprised of a series of turning vanes 37 that form passages 38 for turning the airflow from the tangential direction to a direction more parallel with centerlines of the holes 32.

The vanes 37 accomplish this redirection by curving the airflow radially inward and simultaneously transforming some of the tangential velocity of the airflow into rotational velocity that generally matches the rotational velocity of the turbine shaft 34.

Additionally, if the air has a tangential velocity that greatly exceeds the rotational velocity of the turbine shaft, the deswirler passages 38 are constructed to diffuse the air, converting part of the approach velocity head into static pressure as well as reducing entry loss into the shaft. This reduced entrance loss plus pressure recovery by diffusion permits a higher pressure ratio and acceleration across the nozzle 34. The higher pressure ratio across the nozzle 34 will cause a lower air temperature at the nozzle exit 44. Reduced cooling air temperature permits a reduction in cooling airflow, thus improving turbine efficiency and this is a primary object of the present invention. The reduction in cooling air temperature is accomplished by transferring some of the energy of the air to the turbine, further increasing its efficiency.

While specific embodiments have been described, it will be apparent to those skilled in the art that various modifications thereto can be made without departing from the scope of the invention, as recited in the appended claims. Therefore, the scope of the invention is to be derived from the following claims.

Having described the invention, what is claimed as novel and desired to be secured by Letters Patent of the United States is as follows:

1. In a gas turbine engine having a compressor, a combustor, a rotating turbine section around a central engine axis with associated turbine rotors and a rotating turbine shaft, and a cooling air circuit for providing cooling air into said rotating turbine section through holes in said shaft, said cooling air circuit including means for directing said cooling air into said rotating turbine section with a minimum pressure loss and maximum decrease in temperature, comprising in combination:
   (a) a nozzle for receiving said cooling air in a direction radially inward and substantially perpendicular to said central engine axis, said nozzle being of the convergent type such that in passing through said nozzle the velocity of said air is increased, the temperature and pressure of said air are decreased and said cooling air exits said nozzle at a direction substantially tangential to and in the same direction of rotation as said rotating turbine shaft; and
   (b) a deswirler directly attached to said turbine shaft for rotation therewith, wherein said deswirler includes a plurality of internal turning vanes which extend backwardly in the direction of said rotation and form passages which curve progressively from said substantially tangential direction toward the perpendicular to said central engine axis, and wherein said turning vanes and passages are rotated away from the cooling air exiting said nozzle, and wherein said passages further comprise:
      (i) entrance regions between said vanes which are aligned in serial flow relationship with the cooling airflow exiting said nozzle for aerodynamically accepting said exiting cooling air and wherein said entrance regions initiate a transformation of the substantially tangential velocity of the airflow exiting said nozzle into radial and tangential components by curving the cooling airflow in a radially inwardly direction;
      (ii) intermediate regions having a progressively increasing cross-sectional area for decelerating and diffusing said cooling air and for continuing to curve the direction of said cooling airflow in a radially inward direction thereby continuing the transformation of cooling air tangential velocity into radial and tangential components such that said tangential component generally matches the rotational velocity of said turbine shaft; and
      (iii) exit regions between said vanes, which are generally aligned in serial flow relationship with said holes in said turbine shaft for aerodynamically directing said cooling air into said turbine shaft,
wherein said deswirler passages convert approach velocity head of the cooling air entering said entrance regions into static pressure which static pressure is greater than the pressure of the cooling air entering said deswirler and minimally less than the pressure of the cooling air entering said nozzle and wherein the temperature of said cooling air exiting said deswirler is lower than that of the cooling air entering said nozzle.

* * * * *